Patented May 10, 1938

2,116,783

UNITED STATES PATENT OFFICE 2,116,783

PREPARATION OF FORMALDEHYDE CONCENTRATES

Hermann Finkenbeiner, Constance, and Wendelin Schmäche, Buchschlag, Germany, assignors to Deutsche Gold- und Silber-Scheideanstalt, vormals Roessler, Frankfort-on-the-Main, Germany, a corporation of Germany No Drawing. Application November 9, 1934, Serial No. 752,372. In Germany November 17, 1933

15 Claims. (Cl. 260—140)

This invention relates to the production of formaldehyde concentrates, and more particularly to the production of concentrated modifications of formaldehyde which are readily soluble in water and other solvents.

The preparation of formaldehyde concentrates having a higher formaldehyde content than that of the usual commercial formaldehyde solutions, i. e., 30% to 37% by weight, is known and has been carried out technically. Thus, it is known that when the concentration of commercial formaldehyde solutions is increased above 40% up to about 80%, a pasty product is obtained which, when further dried, yields a pulverant product with a formaldehyde content of about 98%. However, the products obtained in this manner are insoluble or only slightly soluble in water. This is a distinct disadvantage inasmuch as most of the technical applications of formaldehyde require that it be used in the form of a solution.

An object of the present invention is to provide a method of producing formaldehyde concentrates having a high percentage of available formaldehyde; a further object is to produce formaldehyde concentrates which are readily soluble in water and other solvents. Other objects will appear hereinafter.

These objects are accomplished by the process of the present invention wherein formaldehyde solutions of low acidity are utilized as the starting material for the production of formaldehyde concentrates. The formaldehyde solutions which are designated herein as being of low acidity are those which contain appreciably less acid than the usual commercial formaldehyde solutions. It has been discovered that, by concentrating these weakly acid formaldehyde solutions according to the usual known methods, formaldehyde concentrates which are readily soluble in water and other solvents may be produced.

The usual commercial formaldehyde solutions contain about 30% to 35% by weight of formaldehyde and from 0.03% to 0.06% by weight of acid, calculated as formic acid. The preferred solutions for the purposes of the present invention should have a maximum acid content on the order of 0.01% of formic acid. Especially good results are obtained with formaldehyde solutions whose formic acid content is less than 0.01%, for example, from 0.005% to 0.006%. Such solutions may be prepared in various ways, for example, by carefully distilling commercial formaldehyde solution and collecting the less acid fractions of the distillate. The production of distillates of low acidity can be facilitated by adding an acid-neutralizing agent to the commercial formaldehyde solution.

In carrying out the process of the present invention, a formaldehyde solution of suitable low acidity is concentrated by the usual methods, for example, by evaporating under a vacuum. When a formaldehyde concentration of about 80% is reached, the solution is cooled whereupon it solidifies to an apparently solid, white mass with a temporary evolution of heat. The resultant mass is readily soluble in water at 65° C. to a sufficient extent to yield stable solutions containing 25% to 30% by weight of formaldehyde.

If desired, the product obtained in the above manner may be dried further, preferably at the lowest possible temperature and under a vacuum, to produce a dry product of about 93% to 94% formaldehyde content. The latter product is also completely or nearly completely soluble in water at 65° C., at most only a few flocs of paraformaldehyde being left undissolved. By dissolving in water at a temperature of 80° C., completely clear and stable solutions of the usual commercial concentrations may be obtained from this product in all cases. The product is also readily soluble in alcohols and other organic solvents.

The formaldehyde concentrates prepared in accordance with the invention retain their property of ready solubility over long periods of time. They may therefore be utilized advantageously for the preparation of disinfecting tablets and similar products.

We claim:

1. A process for producing soluble formaldehyde concentrates which comprises concentrating an acid formaldehyde solution containing substantially less than 0.03% of formic acid.

2. A process for producing soluble formaldehyde concentrates which comprises concentrating an acid formaldehyde solution containing not more than about 0.01% of formic acid.

3. A process for producing soluble formaldehyde concentrates which comprises evaporating an acid formaldehyde solution containing substantially less than 0.03% of formic acid.

4. A process for producing soluble formaldehyde concentrates which comprises evaporating an acid formaldehyde solution containing not more than about 0.01% of formic acid.

5. A process for producing soluble formaldehyde concentrates which comprises evaporating a formaldehyde solution containing about 0.005% to 0.006% of formic acid.

6. A process for producing soluble formaldehyde concentrates which comprises evaporating under vacuum an acid formaldehyde solution containing not more than about 0.01% of formic acid.

7. A process for producing soluble formaldehyde concentrates which comprises evaporating under vacuum a formaldehyde solution containing about 0.005% to 0.006% of formic acid.

8. A process for producing soluble formaldehyde concentrates which comprises evaporating an acid formaldehyde solution containing substantially less than 0.03% of formic acid and cooling said solution to produce a solid material.

9. A process for producing soluble formaldehyde concentrates which comprises evaporating an acid formaldehyde solution containing not more than about 0.01% of formic acid and cooling said solution to produce a solid material.

10. A process for producing soluble formaldehyde concentrates which comprises evaporating a formaldehyde solution containing about 0.005% to 0.006% of formic acid and cooling said solution to produce a solid material.

11. A process for producing soluble formaldehyde concentrates which comprises evaporating, under vacuum, an acid formaldehyde solution containing substantially less than 0.03% of formic acid and cooling said solution to produce a solid material.

12. A process for producing soluble formaldehyde concentrates which comprises evaporating under vacuum an acid formaldehyde solution containing not more than about 0.01% of formic acid and cooling said solution to produce a solid material.

13. A process for producing soluble formaldehyde concentrates which comprises evaporating under vacuum a formaldehyde solution containing about 0.005% to 0.006% of formic acid and cooling said solution to produce a solid material.

14. A process for producing soluble formaldehyde concentrates which comprises evaporating under vacuum an acid formaldehyde solution containing not more than about 0.01% of formic acid, cooling said solution to produce a solid material and drying said solid material under a vacuum.

15. A process for producing soluble formaldehyde concentrates which comprises evaporating under vacuum a formaldehyde solution containing about 0.005% to 0.006% of formic acid, cooling said solution to produce a solid material, and drying said solid material under a vacuum.

HERMANN FINKENBEINER.
WENDELIN SCHMÄCHE.